Patented Feb. 19, 1946

2,395,344

UNITED STATES PATENT OFFICE 2,395,344

HEAT POLYMERIZATION OF VINYL HALIDES

Frank K. Schoenfeld, Silver Lake, Ohio, assignor to The B. F. Goodrich Company, New York, N. Y., a corporation of New York No Drawing. Application February 10, 1938, Serial No. 189,891

7 Claims. (Cl. 260—88)

This invention relates to the polymerization of vinyl halides, and has as its principal object to decrease materially the time required to form the gamma (insoluble) polymers.

It is well known that vinyl halides polymerize to form thermoplastic resins. The polymerization may be carried out with vinyl chloride alone, or in solution in many different types of solvent, or dispersed in water or other immiscible liquid. Polymerization is catalyzed by actinic radiation or by per-compounds in general, including peroxides such as calcium peroxide, barium peroxide, and benzoyl peroxide, per-acids such as persulfuric acid and per-salts such as the perborates, percarbonates, and perphosphates.

The type of polymer resulting from any of these processes depends to a great extent upon the temperature at which the polymerization is performed. Thus, at 40° C. the product consists mainly of the gamma polymer. Elevation of the temperature, however, greatly accelerates the formation of the soluble polymers. When the polymerization is performed at 60° C. the product consists mainly of the alpha (most soluble) polymer. On the other hand, the rate of polymerization varies directly with the temperature. Thus, at 40° C. it may require 72 hours to form the gamma polymer from an emulsion of vinyl chloride containing benzoyl peroxide as a catalyst, while the polymerization may be completed in a third of this time at 60°.

I have discovered that the rate of production of the gamma polymer may be increased materially by starting the polymerization at a temperature favoring the production of the soluble polymers, reducing the temperature to a temperature favoring the production of the gamma polymer before appreciable amounts of polymer are formed, and continuing the polymerization at the reduced temperature.

The particular temperatures employed will naturally vary with the particular vinyl halide. The length of time elapsing before the temperature is lowered depends upon the starting temperature. At the start of the polymerization process, there is a time lag during which no appreciable polymerization occurs. The polymer is formed very rapidly after polymerization starts, and the rate of conversion at the end becomes slow again. The higher the temperature at which the polymerization is started, the shorter the time which elapses before rapid polymerization begins. Thus, when vinyl chloride is polymerized in emulsion in the presence of benzoyl peroxide at 60° C., no appreciable polymerization occurs during the first four hours. The temperature should be reduced at the end of this time unless the batch is very carefully watched so that the temperature can be reduced immediately when rapid polymerization starts. In the case of vinyl chloride, the temperature is usually reduced to about 40° C., since at this temperature the gamma polymer is formed. It is to be understood that these temperatures are not critical, and that by applying the above principles, the optimum temperature conditions for any polymerization may be obtained.

Though the method of this invention may be applied to any method of polymerization of vinyl chloride, it is most conveniently applied to the polymerization of an emulsion of vinyl chloride in water. Any of the catalysts previously mentioned may be used, benzoyl peroxide being one of the best. Any of the well-known emulsifying, dispersing or wetting agents may be used, typical examples being the salts of the higher alkyl sulfates, particularly those containing from 12 to 18 carbon atoms, such as sodium lauryl sulfate, the salts of alkyl naphthalene sulfonic acids such as sodium isopropyl naphthalene sulfonate and sodium di-isobutyl naphthalene sulfonate, soaps such as sodium oleate and potasisum stearate, glue, glycol laurate, etc. Mixtures of emulsifying agents may also be employed.

As a specific embodiment of my invention, two emulsions were prepared, each containing vinyl chloride 2500 gms., sodium lauryl sulfate 19 gms., sodium isopropyl naphthalene sulfonate 57 gms., benzoyl peroxide 25 gms., and water 3750 gms. Each charge was placed in a 2 gallon glass lined autoclave rotated end over end in a constant temperature bath. The first charge was run for 4 hours and 20 minutes at 60° C. The temperature was reduced to 40° C. within the next ten minutes, and the polymerization was continued for an additional 43 hours and 30 minutes. When the product was washed to remove the emulsifying agents and dried, it was found that 83.5% of the vinyl chloride has been polymerized. The other batch was polymerized for 48 hours at 40° C., and produced only a 64% yield. Both products were uniformly finely divided. They were tested by incorporating 150 grams of the polymer with 113 gms. of tricresyl phosphate and shaping in a heated mold to produce the resilient products described in the U. S. Patent 1,929,453 issued to Waldo L. Semon. Compositions formed from both polymers had good tensile strengths, proving that in both cases a large percentage of the gamma polymer had been formed.

In another experiment, emulsions similar to those previously prepared were polymerized under varying conditions. In the table below, the yields and the tensile strengths in lbs./sq. in. of compositions prepared from 150 parts of polymer and 113 parts of tricresyl phosphate as in the previous example are shown.

| Hours of polymerization at— | | Yield of polymer | Tensile strength |
| --- | --- | --- | --- |
| 60° C. | 40° C. | | |
| | | Per cent | |
| 24 | 0 | 89 | 1,071 |
| 0 | 24 | 31 | 1,850 |
| 4 | 20 | 75 | 1,772 |

The low tensile strength of the product polymerized at 60° C. for 24 hours is due to the large amount of soluble polymer present. It will be observed that by starting the polymerization at 60° C. and reducing the temperature to 40° C. after 4 hours, the yield was increased 2½ times, while the tensile strength remained practically the same. It is obvious, therefore, that this invention provides a very satisfactory method of reducing the time necessary to effect polymerization without deleteriously affecting the properties of the polymer.

While the invention has been specifically described with reference to vinyl chloride, it is also applicable to other vinyl halides such as vinyl bromide and vinyl iodide and to mixtures of a vinyl halide with other monomers such as vinyl acetate, acrylonitrile, methacrylonitrile, methyl methacrylate, etc.

Although I have herein disclosed specific embodiments of my invention, I do not intend to limit myself solely thereto, for it will be obvious to those skilled in the art that many modifications including substituting equivalent materials and varying the amounts of materials used are within the spirit and scope of the invention as defined in the appended claims.

I claim:

1. The method which comprises heating a vinyl halide at a temperature favoring the production of the soluble polymers, cooling to a temperature favoring the production of the insoluble polymer before appreciable amounts of polymer are formed, and continuing the polymerization at the reduced temperature.

2. The method which comprises heating a vinyl chloride emulsion in the presence of a catalyst at a temperature favoring the production of the soluble polymer, cooling to a temperature favoring the production of the insoluble polymer before appreciable amounts of polymer are formed, and continuing the polymerization at the reduced temperature.

3. The method which comprises heating vinyl chloride in the presence of a catalyst at about 60° C., reducing the temperature to about 40° C. before appreciable amounts of polymer are formed, and completing the polymerization at the reduced temperature.

4. The method which comprises heating a vinyl chloride emulsion in the presence of a catalyst at about 60° C., reducing the temperature to about 40° C. before appreciable amounts of polymer are formed, and continuing the polymerization at the reduced temperature.

5. The method which comprises heating a vinyl chloride emulsion in the presence of a catalyst at about 60° C., reducing the temperature to about 40° C. after about 4 hours, and completing the polymerization at the reduced temperature.

6. The method which comprises heating a vinyl chloride emulsion in the presence of a catalyst at a temperature favoring the production of the soluble polymer, cooling to a temperature favoring the production of the insoluble polymer before rapid polymerization starts, and continuing the polymerization at the reduced temperature.

7. The method which comprises heating a vinyl chloride emulsion in the presence of a catalyst at a temperature favoring the production of the soluble polymer until visible polymerization starts, immediately cooling to a temperature favoring the production of the insoluble polymer, and continuing the polymerization at the reduced temperature.

FRANK K. SCHOENFELD.